US007555200B2

(12) United States Patent
Seo et al.

(10) Patent No.: US 7,555,200 B2
(45) Date of Patent: Jun. 30, 2009

(54) RECORDING MEDIUM HAVING A DATA STRUCTURE FOR MANAGING A DATA STREAM RECORDED ON THE RECORDING MEDIUM AND RECORDING AND REPRODUCING METHODS AND APPARATUSES

(75) Inventors: Kang-Soo Seo, Kyunggi-do (KR); Jea-Yong Yoo, Seoul (KR); Byung-Jin Kim, Kyunggi-do (KR); Hyung-Sun Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 294 days.

(21) Appl. No.: 10/870,041

(22) Filed: Jun. 18, 2004

(65) Prior Publication Data

US 2004/0223743 A1 Nov. 11, 2004

Related U.S. Application Data

(63) Continuation of application No. 09/862,487, filed on May 23, 2001, now Pat. No. 7,164,845.

(30) Foreign Application Priority Data

May 23, 2000 (KR) .................................. 00-27828

(51) Int. Cl.
*H04N 5/91* (2006.01)
(52) U.S. Cl. .................... 386/95; 386/112; 386/125; 386/126
(58) Field of Classification Search .................. 386/46, 386/68, 95, 98, 125, 126
See application file for complete search history.

(56) References Cited

U.S. PATENT DOCUMENTS 5,521,898 A 5/1996 Ogasawara
5,559,808 A 9/1996 Kostreski et al.
5,602,956 A 2/1997 Suzuki et al.
5,651,010 A 7/1997 Kostreski et al.
5,729,549 A 3/1998 Kostreski et al.
5,732,185 A 3/1998 Hirayama et al.
5,742,569 A 4/1998 Yamamoto et al.
5,747,136 A 5/1998 Shono et al.
5,771,334 A 6/1998 Yamauchi et al.
5,784,528 A 7/1998 Yamane et al.

(Continued)

FOREIGN PATENT DOCUMENTS

CN 1134583 10/1996

(Continued)

OTHER PUBLICATIONS

Japanese Office Action dated Apr. 22, 2008.

(Continued)

*Primary Examiner*—Huy T Nguyen
(74) *Attorney, Agent, or Firm*—Harness Dickey & Pierce

(57) ABSTRACT

The recording medium includes a data structure having a navigation map. The navigation map includes a number of map entries and indicates the number of map entries. Each map entry maps presentation time with location information for a segment of the data stream stored on the recording medium. The navigation map also includes multi-path information when the data stream includes segments representing multiple reproduction paths.

21 Claims, 5 Drawing Sheets

U.S. PATENT DOCUMENTS

| | | | |
|---|---|---|---|
| 5,819,003 | A | 10/1998 | Hirayama et al. |
| 5,835,493 | A | 11/1998 | Magee et al. |
| 5,854,873 | A | 12/1998 | Mori et al. |
| 5,870,523 | A | 2/1999 | Kikuchi et al. |
| 5,877,817 | A | 3/1999 | Moon |
| 5,884,004 | A | 3/1999 | Sato et al. |
| 5,909,257 | A | 6/1999 | Ohishi et al. |
| 5,913,010 | A | 6/1999 | Kaneshige et al. |
| 5,940,255 | A | 8/1999 | Uwabo et al. |
| 5,949,792 | A | 9/1999 | Yasuda et al. |
| 5,953,187 | A | 9/1999 | Uwabo et al. |
| 5,966,352 | A | 10/1999 | Sawabe et al. |
| 5,987,126 | A | 11/1999 | Okuyama et al. |
| 5,999,698 | A | 12/1999 | Nakai et al. |
| 6,031,962 | A | 2/2000 | Sawabe et al. |
| 6,035,095 | A | 3/2000 | Kaneshige et al. |
| 6,064,796 | A | 5/2000 | Nakamura et al. |
| 6,067,400 | A | 5/2000 | Saeki et al. |
| 6,167,189 | A | 12/2000 | Taira et al. |
| 6,181,870 | B1 | 1/2001 | Okada et al. |
| 6,181,872 | B1 | 1/2001 | Yamane et al. |
| 6,195,726 | B1 | 2/2001 | Hogan |
| 6,219,488 | B1 | 4/2001 | Mori et al. |
| 6,222,805 | B1 | 4/2001 | Mori et al. |
| 6,285,825 | B1 | 9/2001 | Miwa et al. |
| 6,321,027 | B2 | 11/2001 | Honjo |
| 6,336,002 | B1 | 1/2002 | Yamauchi et al. |
| 6,343,062 | B1 | 1/2002 | Furukawa et al. |
| 6,351,442 | B1 | 2/2002 | Tagawa et al. |
| 6,353,613 | B1 | 3/2002 | Kubota et al. |
| 6,360,055 | B1 | 3/2002 | Kaneshige et al. |
| 6,377,747 | B1 | 4/2002 | Murase et al. |
| 6,385,388 | B1 | 5/2002 | Lewis et al. |
| 6,385,389 | B1 | 5/2002 | Maruyama et al. |
| 6,385,394 | B1 | 5/2002 | Okada et al. |
| 6,385,398 | B1 | 5/2002 | Matsumoto |
| 6,393,574 | B1 | 5/2002 | Kashiwagi et al. |
| 6,415,101 | B1 | 7/2002 | deCarmo et al. |
| 6,424,797 | B1 | 7/2002 | Murase et al. |
| 6,445,872 | B1 | 9/2002 | Sano et al. |
| 6,470,140 | B1 | 10/2002 | Sugimoto et al. |
| 6,470,460 | B1 | 10/2002 | Kashiwagi et al. |
| 6,504,996 | B1 | 1/2003 | Na et al. |
| 6,515,101 | B1 | 2/2003 | Sheares |
| 6,546,195 | B2 * | 4/2003 | Kashiwagi et al. .......... 386/126 |
| 6,556,774 | B2 | 4/2003 | Tsumagari et al. |
| 6,564,006 | B1 | 5/2003 | Mori et al. |
| 6,567,608 | B2 | 5/2003 | Mori et al. |
| 6,573,819 | B1 | 6/2003 | Oshima et al. |
| 6,584,277 | B2 * | 6/2003 | Tsumagari et al. ............ 386/95 |
| 6,603,517 | B1 | 8/2003 | Shen et al. |
| 6,618,396 | B1 | 9/2003 | Kondo et al. |
| 6,654,543 | B2 | 11/2003 | Ando et al. |
| 6,788,883 | B1 | 9/2004 | Park et al. |
| 6,801,713 | B1 | 10/2004 | Yagawa et al. |
| 6,901,078 | B2 | 5/2005 | Morris |
| 6,904,227 | B1 | 6/2005 | Yamamoto et al. |
| 7,024,102 | B1 | 4/2006 | Inoshita et al. |
| 7,072,573 | B2 | 7/2006 | Okada et al. |
| 7,106,946 | B1 | 9/2006 | Kato |
| 7,124,303 | B2 | 10/2006 | Candelore et al. |
| 7,236,687 | B2 | 6/2007 | Kato et al. |
| 2001/0033517 | A1 | 10/2001 | Ando et al. |
| 2001/0038745 | A1 | 11/2001 | Sugimoto et al. |
| 2001/0043790 | A1 | 11/2001 | Saeki et al. |
| 2001/0053280 | A1 | 12/2001 | Yamauchi et al. |
| 2002/0015383 | A1 | 2/2002 | Ueno |
| 2002/0015581 | A1 | 2/2002 | Ando et al. |
| 2002/0021761 | A1 | 2/2002 | Zhang et al. |
| 2002/0031336 | A1 | 3/2002 | Okada et al. |
| 2002/0046328 | A1 | 4/2002 | Okada |
| 2002/0076201 | A1 | 6/2002 | Tsumagari et al. |
| 2002/0097981 | A1 | 7/2002 | Seo et al. |
| 2002/0097984 | A1 | 7/2002 | Abecassis |
| 2002/0106196 | A1 | 8/2002 | Yamauchi et al. |
| 2002/0127002 | A1 | 9/2002 | Mori et al. |
| 2002/0145702 | A1 | 10/2002 | Kato et al. |
| 2002/0159368 | A1 | 10/2002 | Noda et al. |
| 2002/0180803 | A1 | 12/2002 | Kaplan et al. |
| 2002/0196365 | A1 | 12/2002 | Cho et al. |
| 2002/0197059 | A1 | 12/2002 | Cho et al. |
| 2003/0002194 | A1 | 1/2003 | Andoh |
| 2003/0026597 | A1 | 2/2003 | Cho et al. |
| 2003/0118327 | A1 | 6/2003 | Um et al. |
| 2003/0123849 | A1 | 7/2003 | Nallur et al. |
| 2003/0133509 | A1 | 7/2003 | Yanagihara et al. |
| 2003/0161615 | A1 | 8/2003 | Tsumagari et al. |
| 2003/0221055 | A1 | 11/2003 | Okada |
| 2003/0235403 | A1 | 12/2003 | Seo et al. |
| 2003/0235404 | A1 | 12/2003 | Seo et al. |
| 2004/0086261 | A1 | 5/2004 | Hanes |
| 2004/0156621 | A1 | 8/2004 | Seo et al. |
| 2004/0179819 | A1 | 9/2004 | Cho et al. |
| 2004/0179820 | A1 | 9/2004 | Kashiwagi et al. |
| 2004/0179827 | A1 | 9/2004 | Cho et al. |
| 2004/0247290 | A1 | 12/2004 | Seo et al. |
| 2004/0252975 | A1 | 12/2004 | Cho et al. |
| 2005/0025459 | A1 | 2/2005 | Kato et al. |
| 2005/0036763 | A1 | 2/2005 | Kato et al. |
| 2005/0232111 | A1 | 10/2005 | Sawabe et al. |
| 2006/0222340 | A1 | 10/2006 | Yamauchi et al. |

FOREIGN PATENT DOCUMENTS

| | | |
|---|---|---|
| CN | 1150293 | 5/1997 |
| CN | 1197573 A | 10/1998 |
| CN | 1220458 | 6/1999 |
| CN | 1237852 A | 12/1999 |
| CN | 1251461 A | 4/2000 |
| EP | 0723216 | 7/1996 |
| EP | 0737980 | 10/1996 |
| EP | 0836183 | 4/1998 |
| EP | 0836189 | 4/1998 |
| EP | 0847198 | 6/1998 |
| EP | 0873022 | 10/1998 |
| EP | 0 896 337 A2 | 2/1999 |
| EP | 0917355 | 5/1999 |
| EP | 0918438 | 5/1999 |
| EP | 0920203 | 6/1999 |
| EP | 0940983 | 9/1999 |
| EP | 1003338 A2 | 5/2000 |
| EP | 1 043 724 A1 | 10/2000 |
| EP | 1081885 | 3/2001 |
| EP | 1126454 | 8/2001 |
| EP | 1198132 | 4/2002 |
| EP | 1198133 | 4/2002 |
| EP | 1202568 | 5/2002 |
| JP | 64-003781 | 1/1989 |
| JP | 01-116819 | 5/1989 |
| JP | 08-088832 | 4/1996 |
| JP | 08-235833 | 9/1996 |
| JP | 09-023403 | 1/1997 |
| JP | 9023403 | 1/1997 |
| JP | 09-251759 | 9/1997 |
| JP | 10-032780 | 2/1998 |
| JP | 10-040667 | 2/1998 |
| JP | 10-51737 | 2/1998 |
| JP | 10-269698 | 10/1998 |
| JP | 10-271449 | 10/1998 |
| JP | 10-299698 | 11/1998 |
| JP | 11-041563 | 2/1999 |
| JP | 11-066813 | 3/1999 |
| JP | 11-103444 | 4/1999 |
| JP | 11-134812 | 5/1999 |

| | | |
|---|---|---|
| JP | 11-185463 | 7/1999 |
| JP | 11-259976 | 9/1999 |
| JP | 11-346341 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-24973 | 1/2001 |
| JP | 2001-024985 | 1/2001 |
| JP | 2001-111944 | 1/2001 |
| JP | 2001-67802 | 3/2001 |
| JP | 2001-111929 | 4/2001 |
| JP | 2001-111960 | 4/2001 |
| JP | 2001-169246 | 6/2001 |
| JP | 2001-297535 | 10/2001 |
| JP | 2002-083486 | 3/2002 |
| JP | 2002-112179 | 4/2002 |
| JP | 2002-150685 | 5/2002 |
| JP | 2002-158972 | 5/2002 |
| JP | 2002-158974 | 5/2002 |
| JP | 2002-176623 | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2006-503400 | 1/2006 |
| KR | 10-1999-0022858 | 10/1997 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 10-2001-0098007 | 11/2001 |
| KR | 10-2001-0098101 | 11/2001 |
| KR | 10-2001-0107578 | 12/2001 |
| KR | 10-2002-0006674 | 1/2002 |
| KR | 10-2002-0020919 | 3/2002 |
| KR | 10-2002-0097454 | 12/2002 |
| KR | 10-2002-0097455 | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | WO 97/13364 | 4/1997 |
| WO | WO 97/13365 | 4/1997 |
| WO | WO 97/13366 | 4/1997 |
| WO | WO97/13365 | 10/1997 |
| WO | WO 98/00952 | 1/1998 |
| WO | WO 99/08281 | 2/1999 |
| WO | WO 99/34601 | 7/1999 |
| WO | WO 00/02195 | 1/2000 |
| WO | WO 00/05883 | 2/2000 |
| WO | WO 00/42515 | 7/2000 |
| WO | WO 00/62295 | 10/2000 |
| WO | WO01/80239 A1 | 10/2001 |
| WO | WO 01/82604 | 11/2001 |
| WO | WO 01/82606 | 11/2001 |
| WO | WO 01/82609 | 11/2001 |
| WO | WO 01/82610 | 11/2001 |
| WO | WO 2004/001748 A1 | 12/2003 |
| WO | WO 2004/001750 | 12/2003 |
| WO | WO 2004/001753 A1 | 12/2003 |
| WO | WO 2004/045206 | 5/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |

OTHER PUBLICATIONS

Japanese Office Action (dated May 7, 2008) for counterpart Japanese Patent Application No. 2004-517390.
Japanese Office Action (dated May 7, 2008) for counterpart Japanese Patent Application No. 2004-517368.
European Search Report (dated Mar. 31, 2008) for counterpart European Patent Application No. 03761863.4-2223.
Chinese Office Action dated Dec. 14, 2007.
Japanese Office Action dated Jan. 22, 2008.
European Search Report dated Dec. 28, 2007.
European Search Report dated Jan. 2, 2008.
United States Office Action dated Jan. 2, 2008.
United States Office Action dated Jan. 28, 2008.
European Search Report dated Aug. 13, 2008.

\* cited by examiner

*Mapping List General Information (MAPL_GI)*

| Field Name | Contents | Size |
|---|---|---|
| TM_ENT_IT | Time Entry Interval | 1 Byte |
| Reserved | Reserved | 1 Byte |
| TM_ENT_Ns | Number of Time Entries | 2 Byte |
| Reserved | Reserved | 1 Byte |
| HOBU_ENT_Ns | Number of HOBU Entries | 3 Byte |

| Field Name | Contents | Size |
|---|---|---|
| TM_ENT_TY | Type of Time Entry | 1 Byte |
| Reserved | Reserved | 1 Byte |
| ST_HOBU_IDX | Index Number of Start HOBU Entry for this Time Entry | 2 Byte |
| ACC_SZ | Accumulated Size | 4 Byte |
| Reserved | Reserved | 1 Byte |
| ACC_TM | Accumulated Time Length | 3 Byte | b7,b6 = 00 : time enty is not in multi path area
b7,b6 = 01 : time enty is in multi path area
b7,b6 = others : reserved b7,b6 = 00 : time enty is not in multi path area
b7,b6 = 01 : time enty is in multi path area
b7,b6 = others : reserved

RECORDING MEDIUM HAVING A DATA STRUCTURE FOR MANAGING A DATA STREAM RECORDED ON THE RECORDING MEDIUM AND RECORDING AND REPRODUCING METHODS AND APPARATUSES

RELATED APPLICATION DATA

This is a continuation of application Ser. No. 09/862,487 filed May 23, 2001 now U.S. Pat. No. 7,164,845; the entire contents of which are hereby incorporated by reference.

BACKGROUND OF THE INVENTION

1. Field of the Invention

The present invention relates to a next generation recording medium such as a high-density DVD (Digital Versatile Disk), and their support of multipath video data (e.g., multi-angle and multi-story data streams).

2. Description of the Related Art

In these days, a digital television able to present high-quality pictures is spreading rapidly and widely through the market.

A high-density DVD player is also being developed. A high-density DVD player aims to reproduce data written in a high-density DVD (called 'HDVD' hereinafter) of a next generation recording medium, whose recording standard is under discussion at present.

For better presentation of data reproduced from a HDVD player, a HDVD player is likely to be connected to a digital television through a digital interface such as IEEE 1394 standard.

In the meantime, a DVD-ROM, which is widely used as a large-capacity recording medium at present, may contain one or more multi-angle or multi-story stream sections. A multi-angle stream has different scenes viewed from different angles and a multi-story stream has different stories in its stream segments. Hereinafter, the word of 'multi-path' means multi-angle or multi-story.

When a multi-path stream section is encountered in reproduction of a DVD-ROM, a user can select desired viewing angle or story at each branching point.

Because the existing DVD-ROM can support multi-path stream, a high-density DVD, whose recording standard is under discussion, should also support multi-path stream. However, a tentative basic standard of a high-density DVD has different navigation data structure, for example TMAP table included, from the existing DVD-ROM, so that the multi-path supporting structure of presentation and navigation data of a DVD-ROM is not applicable to a high-density DVD.

Therefore, new structures of presentation and navigation data should be developed to support multi-path streams in a high-density DVD of a next generation recording medium.

SUMMARY OF THE INVENTION

The recording medium according to the present invention includes a data structure for managing reproduction of a data stream recorded on the recording medium. In particular, the data structure provides for managing a data stream representing multiple reproduction paths (e.g., multiple camera angle reproduction).

In one exemplary embodiment, a navigation area of the recording medium stores a navigation map. The navigation map includes a number of map entries and indicates the number of map entries. Each map entry maps presentation time with location information for a segment of the data stream stored on the recording medium. The navigation map also includes multi-path information when the data stream includes segments representing multiple reproduction paths.

For example, the location information points to a start of the segment on the recording medium, and the presentation time indicates a start presentation time of the segment. Accordingly, at least two map entries for segments representing different reproduction paths of the data stream may have a same presentation time.

In one exemplary embodiment, the multi-path information indicates segments associated with a multiple reproduction path portion of the data stream.

In an exemplary embodiment, a data area stores the data stream, and at least a number of the segments representing different reproduction paths are interleaved in the data area.

The present invention further provides apparatuses and methods for recording and reproducing the data structure according to the present invention.

BRIEF DESCRIPTION OF THE DRAWINGS

The accompanying drawings, which are included to provide a further understanding of the invention, illustrate the exemplary embodiments of the invention, and together with the description, serve to explain the principles of the present invention.

In the drawings.

DETAILED DESCRIPTION OF THE PREFERRED EMBODIMENT

In order that the invention may be fully understood, a exemplary embodiments thereof will now be described with reference to the accompanying drawings.

Figure 1:
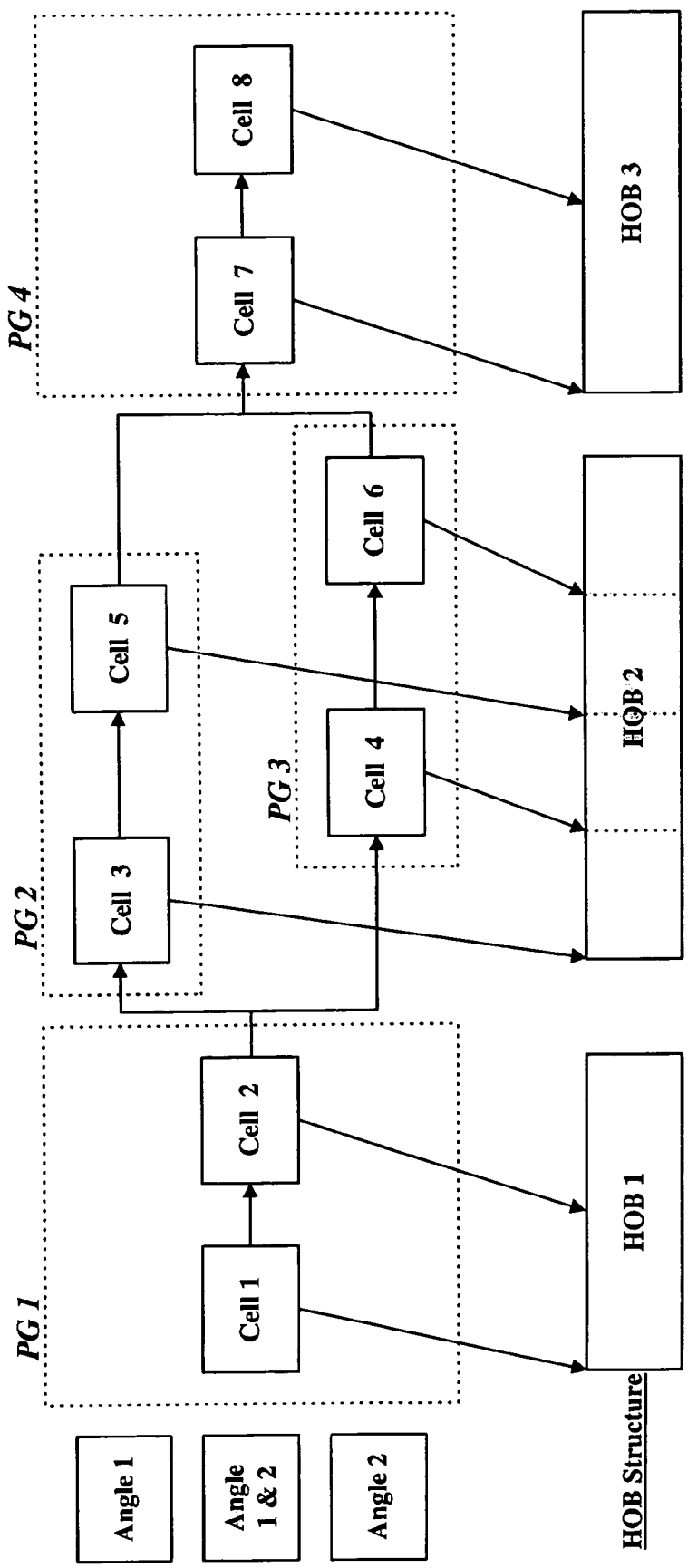
FIG. 1 shows a recorded stream example in which a multi-path data stream section is grouped into a single high-density stream object according to the present invention.

According the present invention, a HDVD is manufactured or data streams are recorded in a HDVD such that a stream section containing a multi-path data stream is grouped in a single high-density stream object (called 'HOB' hereinafter). FIG. 1 shows a recorded stream example formed according to the present invention. In FIG. 1, a VTS (Video Title Set) is composed of two uni-path stream objects HOB 1 and HOB 3 of programs PG1 and PG4 and a single two-path stream object HOB 2 of programs PG2 and PG3, which correspond to the data stream of each path, respectively.

For uni-path data stream information, the program PG1 contains two cells C1 and C2 indicative of the start and some intermediate point of HOB 1, respectively, and the program PG4 contains cells C7 and C8 indicative of the start and some intermediate point of HOB 3, respectively. For the multi-path data stream information, cells C3 and C5 belonging to the program PG2 and cells C4 and C6 belonging to the program PG3 are indicative of each start point of the stream segments in two-path stream object HOB2, respectively.

And, each stream segment in the multi-path stream object HOB 2 is interleaved such that segments of same time to reproduce are physically close to each other. Also, stream sections of programs PG2 and PG3 associated with each path have the same time length.

Each stream object HOB is composed of many high-density stream object units (called 'HOBU' hereinafter). Because a MAPL (MAPping List) is mandatory for quick search of an arbitrary target HOBU or quick random access in a high-density DVD, a MAPL should have suitable structure for the aforementioned recording method of multi-path data stream.

Figure 2:
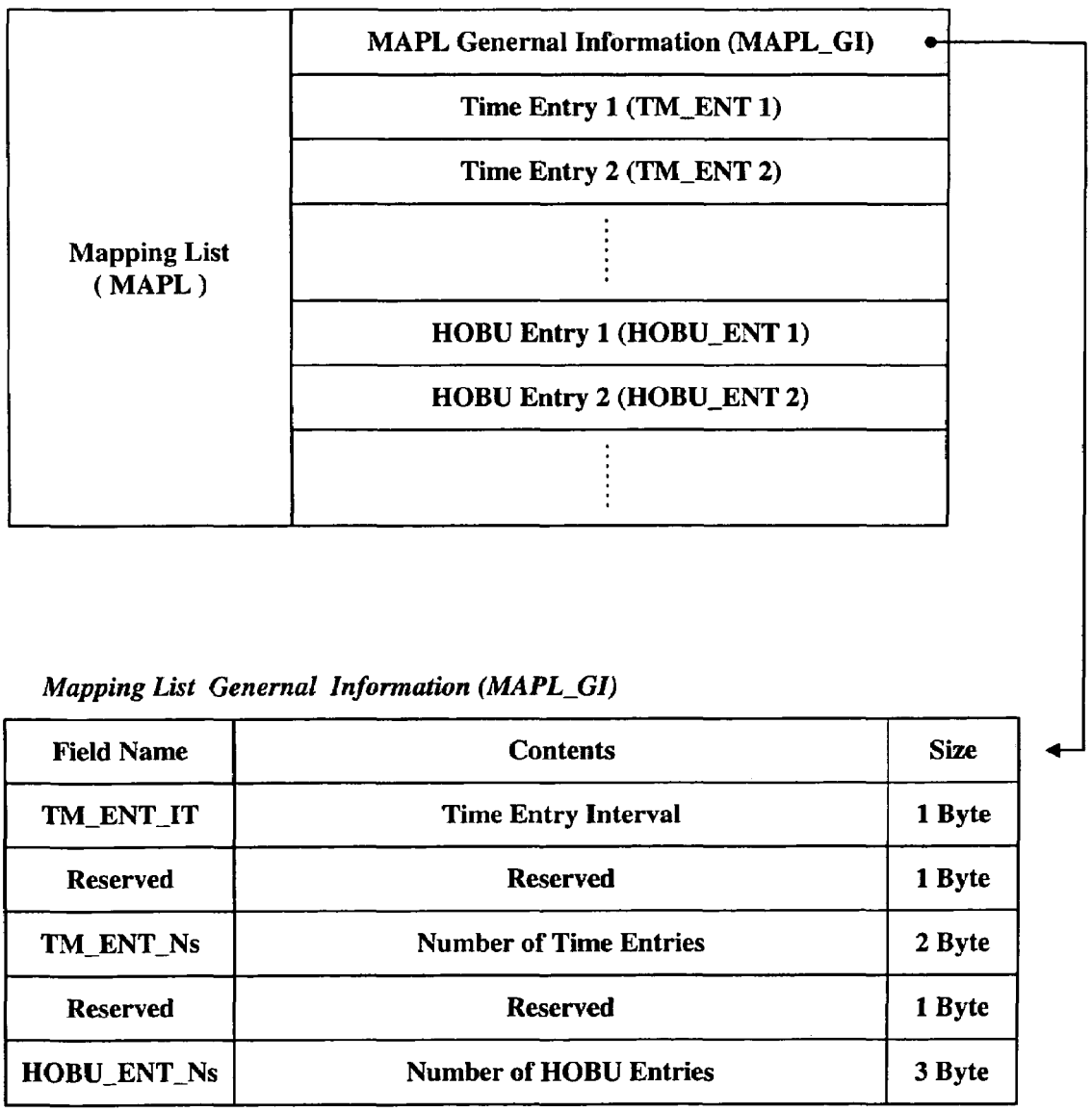
FIG. 2 shows structure of a mapping list.

FIG. 2 shows the overall structure of the MAPL. The MAPL is composed of MAPL general information; HOBU entries for managing information on all HOBUs; and time entries including size, time length information and path information. Each time entry covers a predetermined number, which is defined in MAPL general information, of HOBUs.

The MAPL general information consists of a 'Time Entry Interval' field indicative of the number of HOBUs one time entry covers (e.g., 10), a 'Number of Time Entries' field indicating the number of time entries included in this MAPL, and a 'Number of HOBU Entries' field indicating a number of HOBU entries included in this MAPL.

Figure 3:
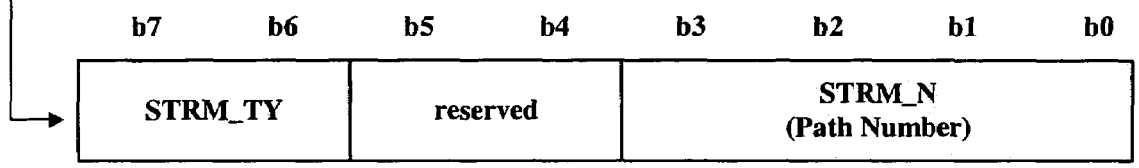
FIG. 3 shows field syntax of a time entry which is a member of the mapping list.

A time entry according to the present invention has the field syntax as shown in FIG. 3. As fields of a time entry, there are Type of Time Entry 'TM_ENT_TY', Index Number of Start HOBU For This Time Entry 'ST_HOBU_IDX', Accumulated Size 'ACC_SZ', and Accumulated Time Length 'ACC_TM'. The 1-byte 'TM_ENT_TY' field is broken into 2-bit 'Stream Type' indicative of whether or not data stream of HOBUs this time entry covers is for multi-path, 4-bit 'Path Number' indicative of path number if corresponding HOBUs are for multi-path, and 2-bit 'Reserved'.

The 'ST_HOBU_IDX' has an index value pointing a start HOBU of several HOBUs this time entry covers. The 'ACC_SZ' and 'ACC_TM' have information on accumulated size and time length, respectively, of preceding HOBUs before the start HOBU of this time entry. When accumulating the time length, those of HOBUs of only same path are accumulated if the HOBUs contain multi-path data stream. Therefore, the time length of HOBUs in preceding time entries are excluded in calculating accumulated information for a current time entry if the path of the preceding time entries is different from that of the current one; however, the size of those HOBUs are included in the accumulated size of the HOBUs.

The value '00b' written in 2-bit 'Stream Type' represents that several HOBUs corresponding to the time entry are for uni-path, whereas '01b' represents multi-path.

Figure 4:
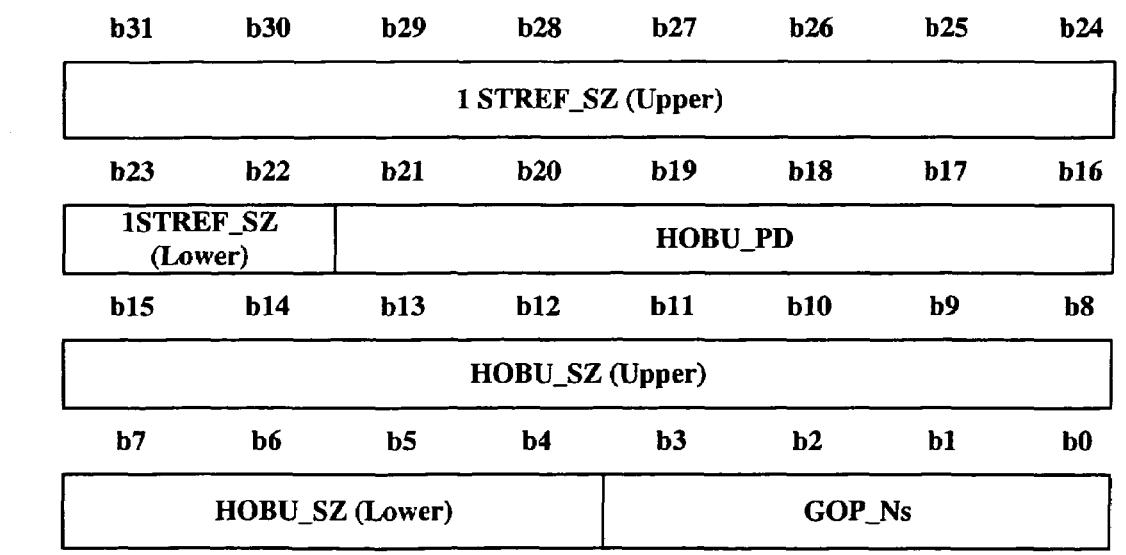
FIG. 4 shows field syntax of a high-density stream object unit entry which is a member of the mapping list.

FIG. 4 shows field syntax of a HOBU entry of the MAPL general information. The HOBU entry consists of '1STREF_SZ' field describing distance from the beginning of HOBU to the end address of the first I-picture, the 'HOBU_SZ' field describing the size of this HOBU in sectors, the 'GOP_Ns' field describing the number of GOP in this HOBU, and the 'HOBU_PD' field describing the number of video fields in this HOBU.

Figure 5:
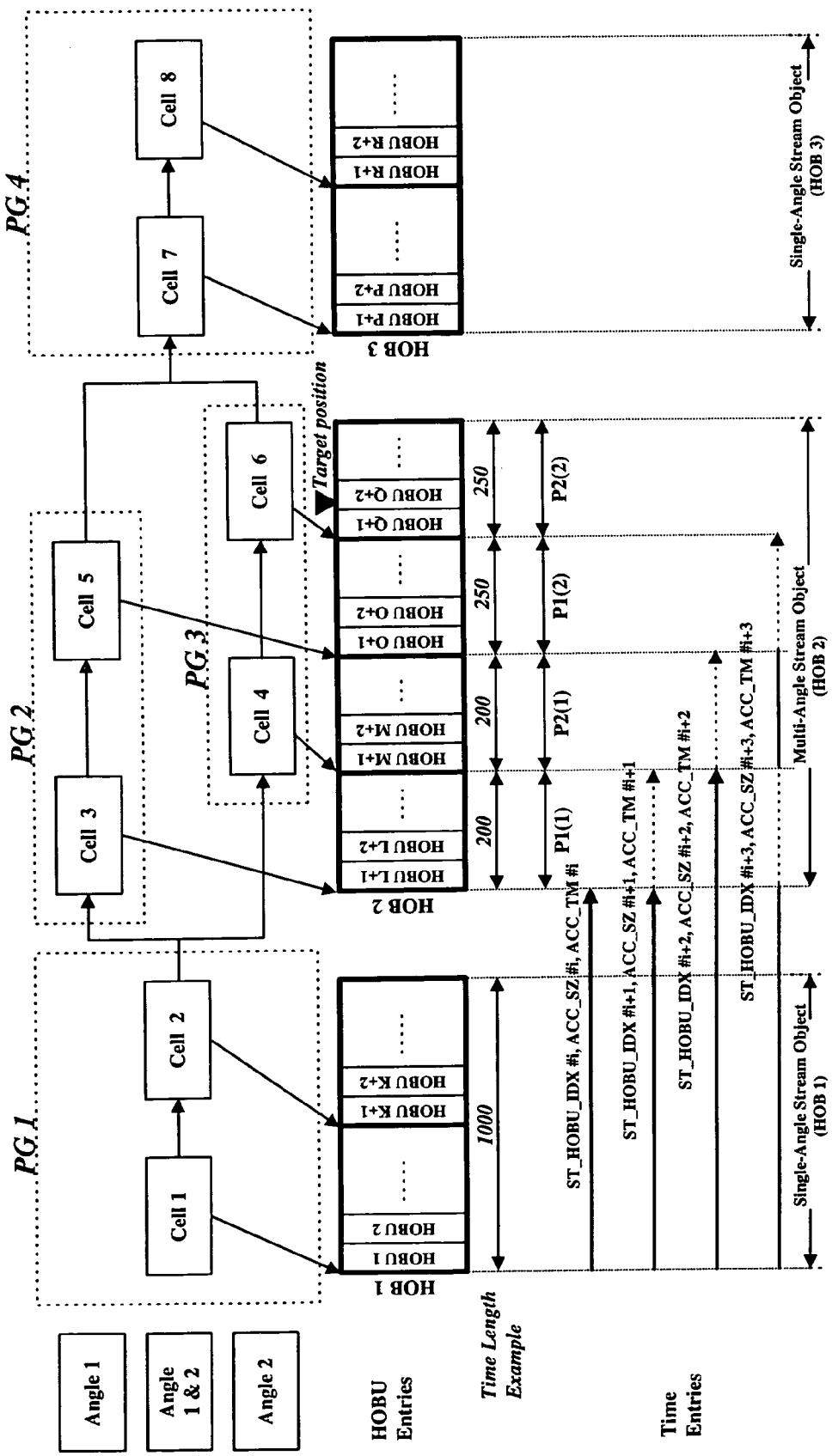
FIG. 5 shows a detailed example of recorded data stream and searching algorithm conducted therein.

FIG. 5 is detailed example of recorded data stream of FIG. 1, and schematically depicts information written in time entries for such-recorded data stream.

In the stream example of FIG. 5, the time entry #i+1 covering from the start HOBU (L+1) of program PG2 and, for example 9 HOBUs belonging to the stream segment P1(1) to which cell 3 refers, points the HOBU (L+1) with the 'ST_HO-BU_IDX' field, and has, in the 'ACC_SZ' and 'ACC_TM' fields, accumulated size and time length of the preceding HOBUs, that is, all HOBUs of HOB 1.

The time entry #i+2 covering from the start HOBU (M+1) of program PG3 and subsequent HOBUs, which belong to the stream segment P2(1) to which cell 4 points the HOBU (M+1) with its 'ST_HOBU_IDX' field. However, the time length of the stream segment P1(1) is not added in calculating accumulated time length of preceding HOBUs for the 'ACC_TM' field of this time entry #i+2 because the path (e.g., angle) of stream segment P1(1) is different. Therefore, accumulated time length of all HOBUs of only HOB 1 are written in the 'ACC_TM' field of the time entry #i+2.

However, the summed size of the stream segment P1(1) is added to the size of HOB 1, and is then written in the 'ACC_SZ' field of the time entry #i+2, although two paths are different each other.

Similarly, the time length of the stream segment P2(1) of path (e.g., angle) 2 to which cell 4 refers is not accumulated for the 'ACC_TM' field of the time entry #i+3 covering from the HOBU (O+1) to some next HOBUs containing data stream of path (e.g., angle) 1, and the time lengths of the stream segments P1(1) and P1(2) to which cells 3 and 5 refer, respectively, are not accumulated for the 'ACC_TM' field of the time entry #i+4 covering from the HOBU (Q+1) to some next HOBUs.

Accordingly, as will be appreciated from FIG. 5, the accumulated time provided by different time entries for different paths may be the same.

In FIG. 5, the interval which should be excluded in calculating accumulated time length for the four time entries is marked with a dotted line.

A HDVD containing a multi-path data stream recorded according to the above-explained method is searched and reproduced as follows.

Figure 6:
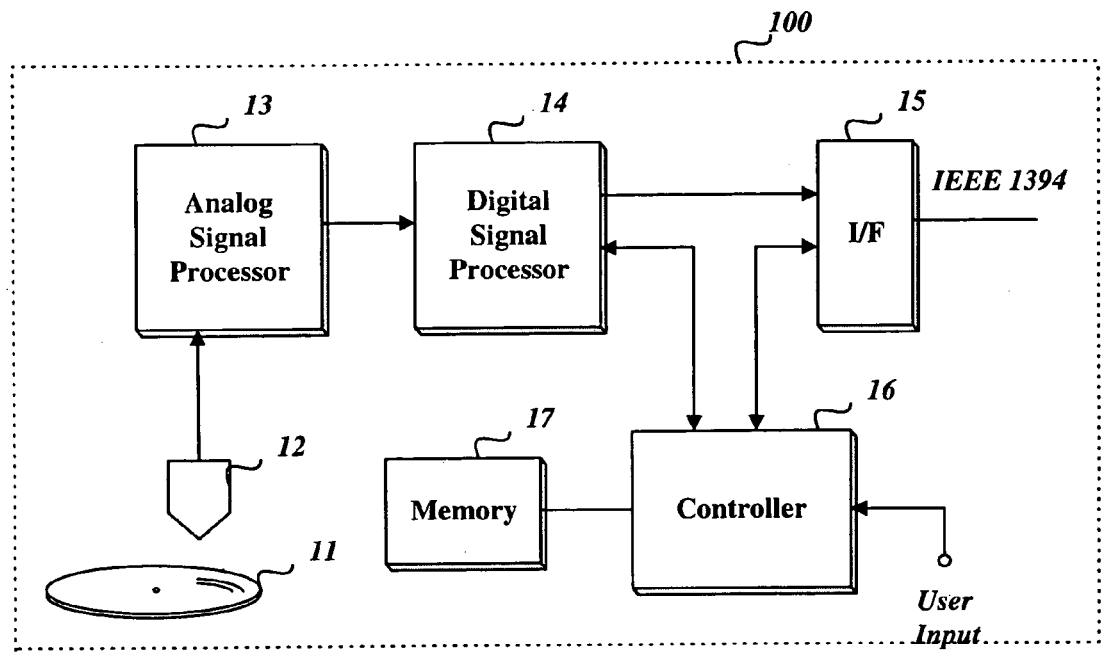
FIG. 6 is a block diagram of a disk device reproducing a high-density DVD containing a data stream recorded according to the present invention.

FIG. 6 shows a block diagram of a HDVD player being capable of searching and reproducing a HDVD having a data structure according to the present invention as described above. The HDVD player 100 of FIG. 6 includes an optical pickup 12 reading signals recorded in a HDVD 11; an analog signal processor 13 binarizing the read signals after compensating levels of the signals; a digital signal processor 14 restoring the binarized signals into digital data and separating the restored data into presentation data containing A/V data and navigation data for reproduction control; an interfacing unit 15 sending the presentation data and PCI (Presentation Control Information) data according to the navigation data to a digital television 200 connected through IEEE 1394 standard; a controller 16 controlling the above elements according to the navigation data and/or user's commands; and a memory 17 storing data which are necessary for the control operation and are generated in data reproduction.

When a certain position is entered with a desirable angle as a target, the controller 16 refers to time entries of the MAPL stored in the memory 17; the MAPL having been read out from the HDVD 11 at an initial driving step.

For clearer explanation of a searching operation for a given target according to the present invention, it is assumed that a target position is 1201 expressed in time that is within the stream interval defined by cell 5 of the program PG2 or the cell 6 of the program PG3 containing multi-path data stream.

When receiving a target position of 1201, the controller 16 reads time entries of MAPL stored in the memory 17 sequentially and compares the target time with the 'ACC_TM' of each time entry. While comparing the two time information, if the read value of 'ACC_TM' field exceeds the target time 1201, the controller 16 determines a time entry, that is, time entry #i+3 in the stream example of FIG. 5, before the time entry whose 'ACC_TM' exceeds the target time 1201, and checks the two MSBs of the field 'TM_ENT_TY' of the determined time entry. If the value of the two MSBs is '01b' for multi-path indication, then the controller 16 checks whether or not the 'Path (Angle) Number' written in the 'TM_ENT_TY' is identical to a path (angle) number entered when the target position was entered.

If the entered path number is 2, the controller 16 searches the MAPL again for a time entry whose 'ACC_TM' exceeds the target time 1201 since the path (angle) number of the time entry #i+3 is 1. Through this successive searching operation, the time entry #i+4 is found since its path number is same with the entered path number and its accumulated time of 1200 is closest to and does not exceed the target value of 1201. This means that the target position is in the HOBUs this time entry #i+4 covers. The controller 16 reads the accumulated size 'ACC_SZ' of the time entry #i+4, and then moves the pickup 12 to the start location of HOBU (Q+1) with reference to the read accumulated size and the index value written in 'ST_HOBU_IDX' field of the time entry #i+4.

If the recorded data stream is reproduced from the start point of the HOBU (Q+1) by the pickup 12, the controller 12 examines the navigation data from the digital signal processor 14 to exactly find where of the reproduced data stream is corresponding to the target location 1201.

Figure 7:
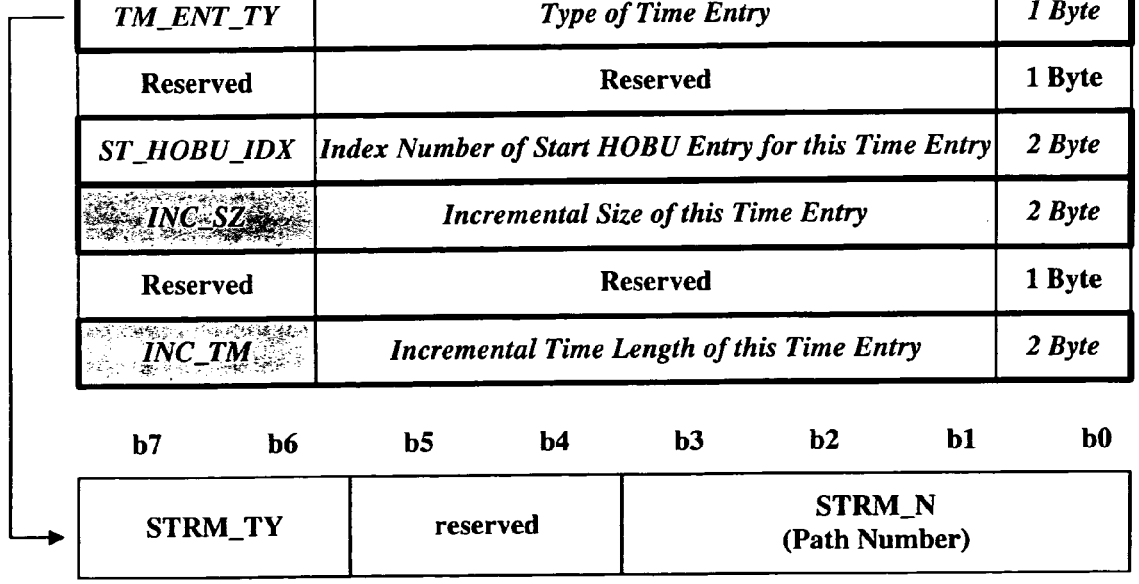
FIG. 7 shows another field syntax of a time entry according to the present invention.

In the above embodiment, the time entry has the fields 'ACC_SZ' and 'ACC_TM' indicating a size and time length accumulated from the start point of a video title set. However, another embodiment of a time entry may be implemented such that a time entry has incremental time length 'INC_TM' and incremental size 'INC_SZ' fields in which time length and size, respectively, of a number of HOBUs, whose number is defined in the field 'TM_ENT_IT' of MAPL general information (e.g., 10 HOBUs), is recorded. FIG. 7 shows field syntax of a time entry defined according to this embodiment.

In this embodiment, the incremental information is written in respective fields instead of accumulated information. If a target position expressed in time is entered, the controller 16 sequentially sums up the 'INC_TM' and 'INC_SZ' fields from the first time entry to a subsequent time entry until the summed time length exceeds the target time. In this summation, if the path (angle) number of a time entry is different from an entered path (angle) number, the incremental time length of that time entry is not summed whereas the incremental size is summed. And, if the target position is for uni-path so that a path number is not entered, only one path, for example path (angle) 1 is considered in the summation for time entries covering multi-path data stream of HOB 2. That is, 'INC_TM' of time entries for stream segments P1(1) and P1(2) are summed.

The such-summed time length is compared with the entered target time by the controller 16 to know whether it exceeds the target. If a time entry whose incremental time length makes the summed time length exceed the target time is determined through this comparison, the controller 16 conducts a rough search using the summed size subtracted by the incremental size of the determined time entry and the index value 'ST_HOBU_IDX' of the determined time entry. The controller 16 then conducts a fine search in which the data stream is practically reproduced and its navigation data is examined to point at the exact location of the reproduced data stream.

The multi-path stream supporting method and the data stream searching method according to the present invention, may make the searching of information such as MAPL compatible with multi-path data stream structures, and prevent searching errors which might be caused from multi-path data stream structures in a high-density DVD.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A machine readable medium having a data structure for managing reproduction of a data stream recorded on the machine readable medium by a reproducing apparatus, comprising:

a navigation area storing a navigation map for managing reproduction of the data stream by the reproducing apparatus, the navigation map including a plurality of mapping entries, the navigation map including a field for representing a number of mapping entries in the navigation map, the navigation map mapping presentation time with location information for a corresponding segment of the data stream stored on the machine readable medium for each of the mapping entries, and the navigation map including, for each of the mapping entries, at least a first field for representing the location information of the corresponding segment of the data stream, and a second field for representing multi-path related information of the corresponding segment of the data stream, the first and second fields being separate fields.

2. The machine readable medium of claim 1, wherein the location information points to a start of the segment on the machine readable medium.

3. The machine readable medium of claim 2, wherein the presentation time indicates a start presentation time of the segment.

4. The machine readable medium of claim 1, wherein the presentation time indicates a start presentation time of the segment.

5. The machine readable medium of claim 1, wherein at least two mapping entries for segments representing different reproduction paths of the data stream have a same presentation time.

6. The machine readable medium of claim 1, wherein the multi-path related information indicates segments associated with a multiple reproduction path portion of the data stream.

7. The machine readable medium of claim 1, further comprising: a data area storing the data stream.

8. The machine readable medium of claim 7, wherein portions of the data stream associated with different reproduction paths are in different segments.

9. The machine readable medium of claim 7, wherein at least a number of the segments representing different reproduction paths are interleaved in the data area.

10. The machine readable medium of claim 1, wherein the multiple reproduction paths are multiple camera angles.

11. A method of managing a data stream recorded on a recording medium, comprising:

reproducing a navigation map recorded on the recording medium, the navigation map including a plurality of mapping entries, the navigation map including a field for representing a number of mapping entries in the navigation map, the navigation map mapping presentation time with location information for a corresponding segment of the data stream stored on the recording medium for each of the mapping entries, and the navigation map including, for each of the mapping entries, at least a first field for representing the location information of the corresponding segment of the data stream, and a second field for representing multi-path related information of the corresponding segment of the data stream, the first and second fields being separate fields.

12. The method of claim 11, further comprising: determining a location to begin reproducing the data stream based on the navigation map.

13. The method of claim 12, wherein the determining step determines the location based on the navigation map and a target starting presentation time.

14. A reproduction apparatus, comprising:
an optical reproducing device configured to reproduce data recorded on the recording medium;
a controller, operably coupled to the optical reproducing device, configured to control the optical reproducing device to reproduce a navigation map recorded on the recording medium, the navigation map including a plurality of mapping entries, the navigation map including a field for representing a number of mapping entries in the navigation map, the navigation map mapping presentation time with location information for a corresponding segment of a data stream stored on the recording medium for each of the mapping entries, and the navigation map including, for each of the mapping entries, at least a first field for representing the location information of the corresponding segment of the data stream, and a second field for representing multi-path related information of the corresponding segment of the data stream, the first and second fields being separate fields.

15. The method of claim 14, wherein the controller determines a location to begin reproducing the data stream based on the navigation map.

16. The method of claim 15, wherein the controller determines the location based on the navigation map and a target starting presentation time.

17. A method of recording a data structure for managing a data stream on a recording medium, comprising:
recording a navigation map on the recording medium, the navigation map including a plurality of mapping entries, the navigation map including a field for representing a number of mapping entries in the navigation map, the navigation map mapping presentation time with location information for a corresponding segment of the data stream stored on the recording medium for each of the mapping entries, and the navigation map including, for each of the mapping entries, at least a first field for representing the location information of the corresponding segment of the data stream, and a second field for representing multi-path related information of the corresponding segment of the data stream, the first and second fields being separate fields.

18. An apparatus for recording a data structure for managing a data stream on a recording medium, comprising:
an optical recording device configured to record data on the recording medium;
a controller, operably coupled to the optical recording device, configured to control the optical recording device to record a navigation map on the recording medium, the navigation map including a plurality of mapping entries, the navigation map including a field for representing a number of mapping entries in the navigation map, the navigation map mapping presentation time with location information for a corresponding segment of the data stream stored on the recording medium for each of the mapping entries, and the navigation map including, for each of the mapping entries, at least a first field for representing the location information of the corresponding segment of the data stream, and a second field for representing multi-path related information of the corresponding segment of the data stream, the first and second fields being separate fields.

19. The apparatus of claim 14, wherein the optical reproducing device includes an optical pickup.

20. The apparatus of claim 18, wherein the optical recording device includes an optical pickup.

21. The machine readable medium of claim 1, wherein the navigation map identifies a presentation time of a target position of the corresponding segment of the data stream based on the multi-path related information.

* * * * *